US009484785B2

(12) United States Patent
Fu et al.

(10) Patent No.: US 9,484,785 B2
(45) Date of Patent: Nov. 1, 2016

(54) ELECTRIC MOTOR

(75) Inventors: Tao Fu, Shenzhen (CN); Chi Keung Law, Hong Kong (CN)

(73) Assignee: JOHNSON ELECTRIC S.A., Murten (CH)

( * ) Notice: Subject to any disclaimer, the term of this patent is extended or adjusted under 35 U.S.C. 154(b) by 477 days.

(21) Appl. No.: 13/343,185

(22) Filed: Jan. 4, 2012

(65) Prior Publication Data

US 2012/0175979 A1 Jul. 12, 2012

(30) Foreign Application Priority Data

Jan. 7, 2011 (CN) .......................... 2011 1 0004060

(51) Int. Cl.
*H02K 5/14* (2006.01)
*H01R 39/36* (2006.01)
*H01R 39/40* (2006.01)

(52) U.S. Cl.
CPC ............... *H02K 5/148* (2013.01); *H01R 39/36* (2013.01); *H01R 39/40* (2013.01)

(58) Field of Classification Search
CPC ........ H02K 5/14; H02K 5/143; H02K 5/145; H02K 5/146; H02K 5/148; H02K 13/00; H02K 13/10; H02K 13/105; H01R 39/383; H01R 39/385; H01R 39/41
USPC .......... 310/238–239, 242, 245, 249; 173/217
See application file for complete search history.

(56) References Cited

U.S. PATENT DOCUMENTS

| 2,695,968 | A | * | 11/1954 | Welch et al. ................. 310/246 |
| 4,413,200 | A | * | 11/1983 | Fenicle ......................... 310/239 |
| 5,006,742 | A | * | 4/1991 | Strobl ...................... H02K 5/10 310/43 |
| 5,015,896 | A | * | 5/1991 | Wong .............................. 310/71 |
| 5,600,193 | A | * | 2/1997 | Matsushima et al. ...... 310/68 C |
| 5,753,993 | A | * | 5/1998 | Steidle et al. ................ 310/239 |
| 5,793,141 | A |   | 8/1998 | Simonsen et al. |
| 6,394,191 | B1 | * | 5/2002 | Nakane ......................... 173/217 |
| 7,180,219 | B2 |   | 2/2007 | Xu |
| 2002/0185290 | A1 | * | 12/2002 | Tang ...................... B25F 5/001 173/216 |
| 2005/0242683 | A1 | * | 11/2005 | Lau .............................. 310/239 |
| 2006/0028091 | A1 | * | 2/2006 | Xu ................................ 310/239 |
| 2010/0207483 | A1 | * | 8/2010 | Buttner et al. ................ 310/242 |

FOREIGN PATENT DOCUMENTS

CN 2490753 Y 5/2002
JP 200210614 A * 4/2002 ............... H02K 9/06

* cited by examiner

*Primary Examiner* — Quyen Leung
*Assistant Examiner* — Eric Johnson
(74) *Attorney, Agent, or Firm* — Muncy, Geissler, Olds & Lowe, P.C.

(57) ABSTRACT

An electric motor has a rotor and a stator. The stator has an endcap with two brush assemblies, two brush brackets for holding the brush assemblies and two electrical terminals. Each brush assembly is detachably mounted to its brush bracket and has a brush holder, a brush slidably received in the brush holder, a spring for urging the brush out of the brush holder, and a conductive member electrically connecting the brush with a corresponding electrical terminal via a resilient releasable connection.

12 Claims, 4 Drawing Sheets

ELECTRIC MOTOR

CROSS REFERENCE TO RELATED APPLICATIONS

This non-provisional patent application claims priority under 35 U.S.C. §119(a) from Patent Application No. 201110004060.7 filed in The People's Republic of China on 7 Jan. 2011.

FIELD OF THE INVENTION

This invention relates to an electric motor and in particular, to an electric motor having replaceable brushes.

BACKGROUND OF THE INVENTION

A brush motor usually includes a rotor with a commutator, a housing with two endcaps at both axial ends thereof, permanent magnets mounted on the housing, and brushes for making slide contact with the commutator. Traditionally, the brushes are enclosed within one endcap of the motor and can not be reached from the outside of the endcap. Thus it is difficult to replace the brushes. Once the brushes are worn out, the entire motor or the product using the motor will be disposed of even if other parts are still in good condition.

To solve the above mentioned problem, Chinese utility model CN2490753(Y) discloses a miniature DC electric motor with replaceable brushes. Two brush brackets are detachably mounted on the endcap. Each brush bracket has a sliding tube radially extended therein. Two brushes are arranged in the sliding tubes and are supported by covers in the radial direction via a spring. The covers are in thread engagement with the sliding tubes and the brushes can be removed by screwing off the covers and then replaced. Each brush has a lead wire led out from a hole in the cover to connect to a power supply. In this patent, the replacement of the brushes is complicated and professional skills such as disconnecting and connecting the lead wire to the power supply are required. For ordinary users of domestic products, they may need to deliver the product to professional service centers.

SUMMARY OF THE INVENTION

According to one aspect, the present invention provides an electric motor comprising: a rotor which comprises a shaft, a rotor core fixed on the shaft, a commutator fixed on the shaft and adjacent to the rotor core, and rotor windings wound about teeth of the rotor core and electrically connected to the commutator; and a stator which is magnetically coupled to the rotor and comprises an endcap and at least two brush assemblies, the endcap having at least two brush brackets for holding the at least two brush assemblies and at least two electrical terminals respectively corresponding to the at least two brush brackets, each brush assembly being detachably mounted to its corresponding brush bracket and having a brush holder, a brush received in the brush holder for making sliding contact with the commutator, a resilient member resiliently urging the brush against the commutator, and a conductive member electrically connecting the brush with a corresponding electrical terminal; wherein each electrical terminal has a resilient end being in resilient contact with its corresponding conductive member.

Preferably, the electric motor further comprises at least two brush covers detachably engaged with the at least two brush brackets.

Preferably, the brush covers are connected to the brush brackets by a screw thread connection.

Preferably, the conductive member comprises a base portion electrically connected to the brush and a contact portion radially and inwardly extending from the base portion outside of the brush holder and in contact with the resilient end of the electrical terminal.

Preferably, a pair of positioning portions inwardly extends from the base portion of the conductive member to position the resilient member there between.

Preferably, the endcap has a first member and a second member which are mounted together in an axial direction of the shaft; the electrical terminals are mounted to the first member, the resilient ends of the electrical terminals are arranged between the first member and the second member in the axial direction; the brush brackets are arranged at the second member; and the contact portion of the conductive member is inserted between the second member and the resilient end of the electrical terminal.

Preferably, the brush assembly further comprises a brush cap and the base portion is arranged between the brush holder and the brush cap.

Preferably, a U-shaped portion axially extends from the brush holder and has a bottom and two branches radially extending from the bottom, the base portion being radially positioned between the bottom and a portion of the brush cap being inserted between the two branches.

Preferably, the brush bracket has a joint portion with a part annular structure having two adjacent ends, the two branches being inserted between the two adjacent ends.

According to another aspect, the present invention also provides an electric appliance comprising a casing, an electric motor, and a working part driven by the motor, the electric motor comprising: a rotor comprising a shaft, a rotor core fixed on the shaft, a commutator fixed on the shaft and adjacent to the rotor core, and rotor windings wound about teeth of the rotor core and electrically connected to the commutator; and a stator magnetically coupled to the rotor and comprising an endcap and at least two brush assemblies, the endcap having at least two brush brackets for holding the at least two brush assemblies and at least two electrical terminals respectively corresponding to the at least two brush brackets, each brush assembly being detachably mounted to its corresponding brush bracket and having a brush holder, a brush received in the brush holder for making sliding contact with the commutator, a resilient member urging the brush into contact with the commutator, and a conductive member electrically connecting the brush with a corresponding electrical terminal; wherein each electrical terminal has a resilient end being in resilient contact with its corresponding conductive member; at least two brush covers are detachably engaged with the at least two brush brackets; and each brush bracket has a joint portion extending outside of the casing for being engaged with the corresponding brush cover from outside the casing.

In the present invention, the brush assemblies can be easily reached by screwing off the brush covers and further can be conveniently replaced without any professional skill being required.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
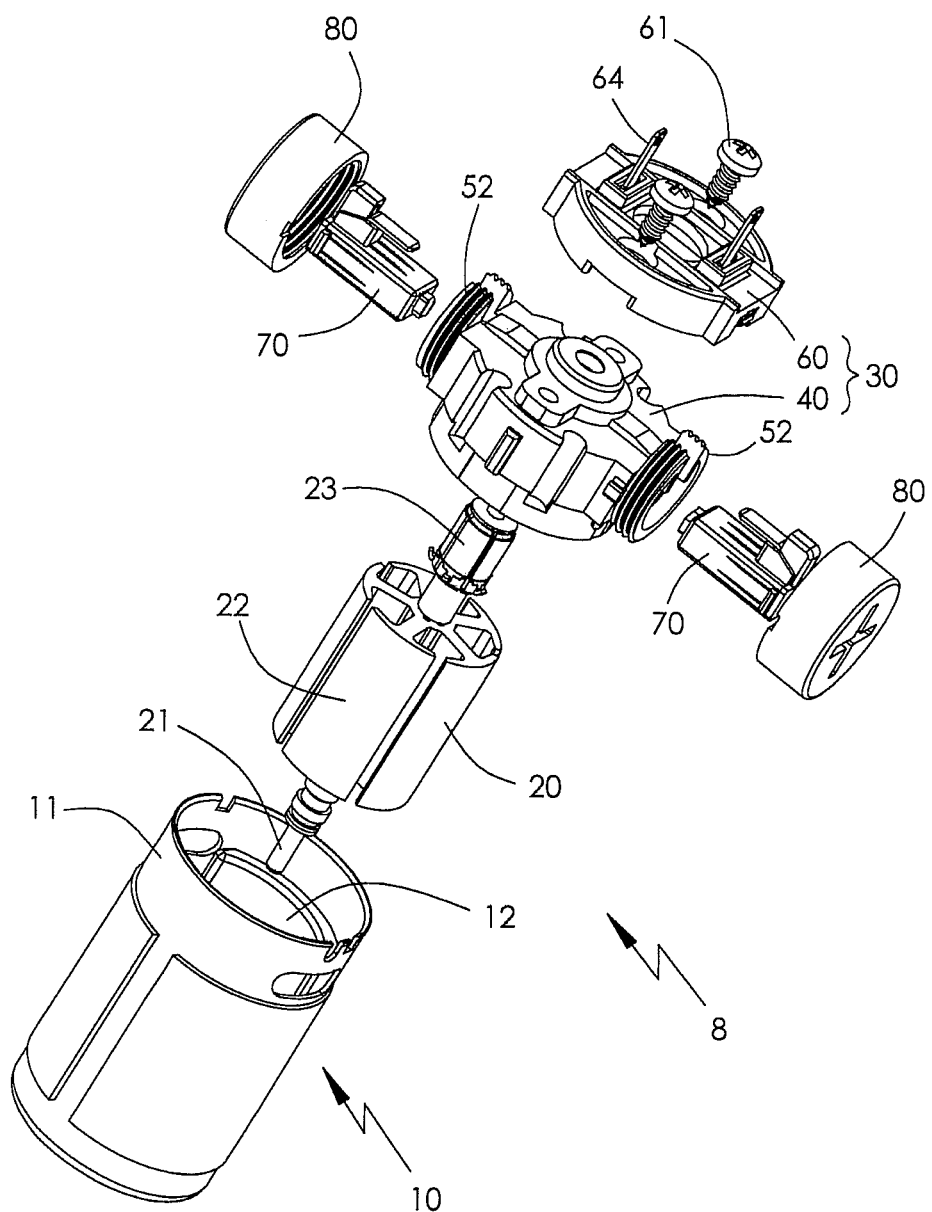
FIG. 1 is an exploded view of an electric motor in accordance with a preferred embodiment of the present invention.
Figure 2:
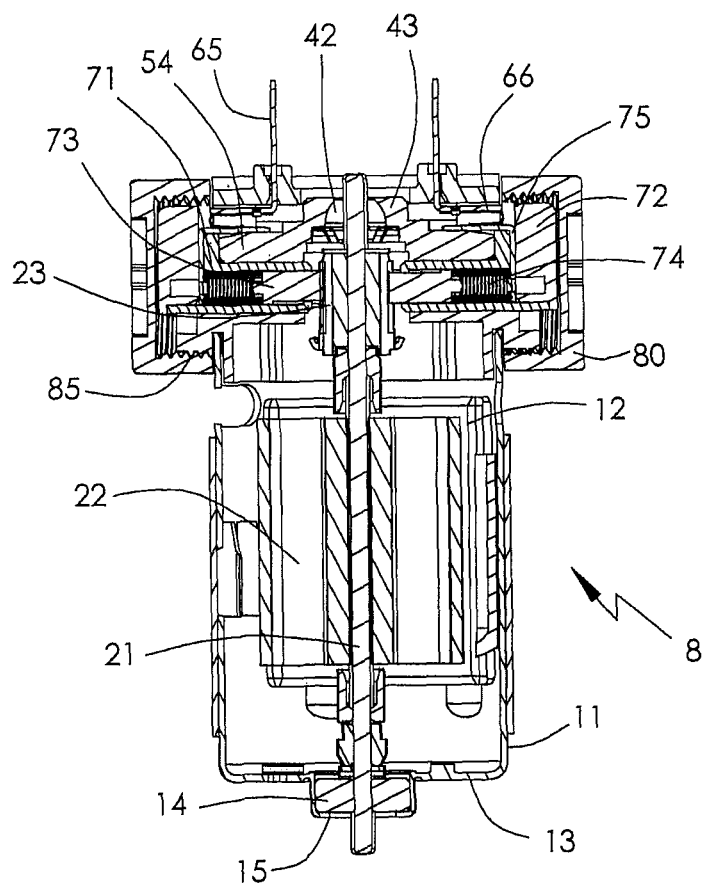
FIG. 2 is a sectional view of the motor of FIG. 1.
Figure 3:
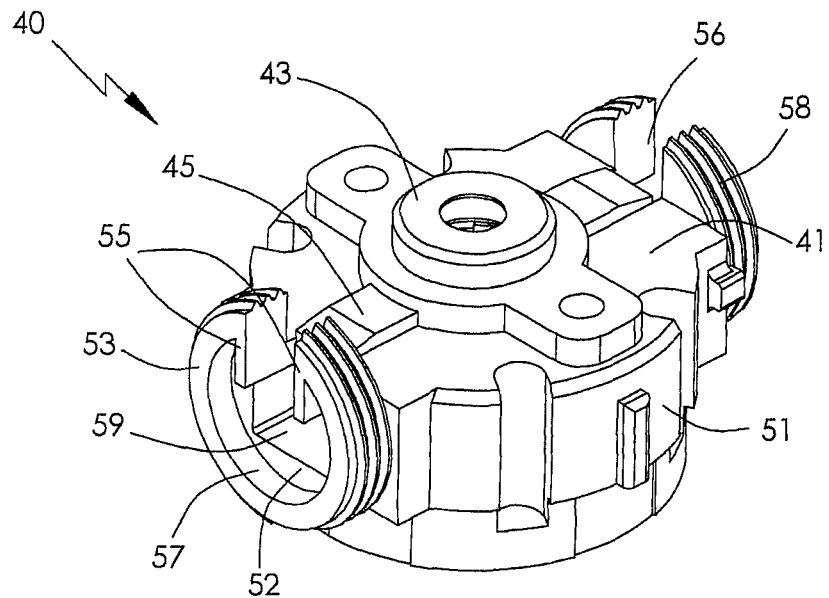
FIG. 3 shows a first member of an endcap being a part of the motor.
Figure 4:
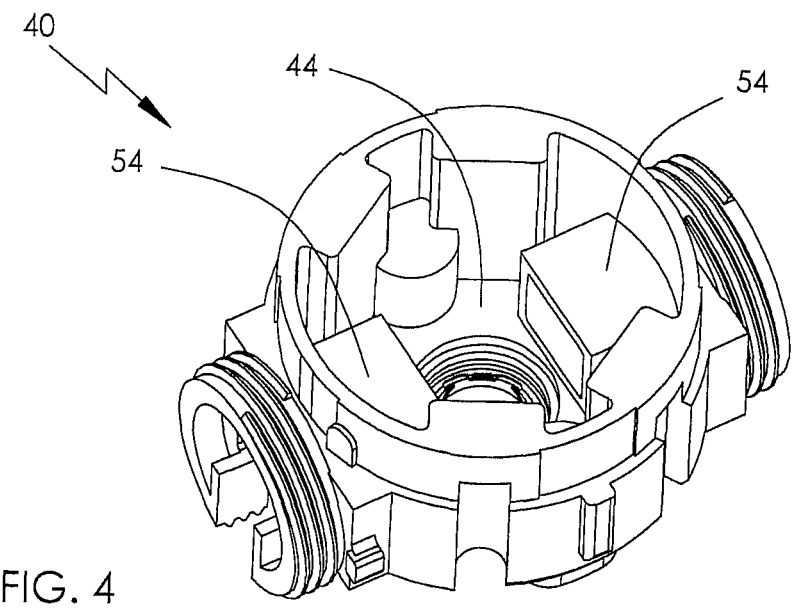
FIG. 4 is a view from below of the first member.
Figure 5:
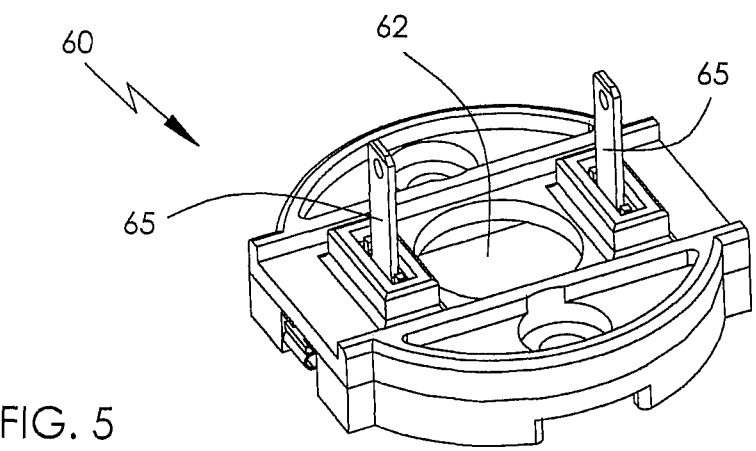
FIG. 5 shows a second member of the endcap.
Figure 6:
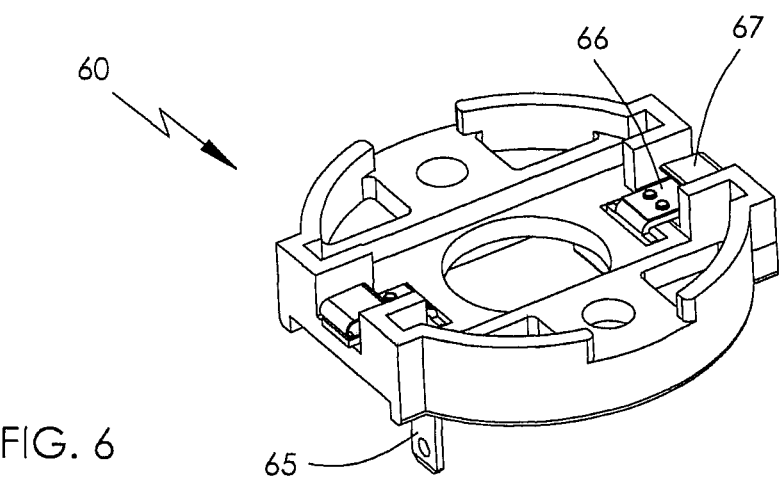
FIG. 6 is a view from below of the second member.

Referring to FIGS. 1 and 2, an electric motor 8 in accordance with a preferred embodiment of the present invention has a stator 10 and a rotor 20 installed in the stator 10. The rotor 20 comprises a shaft 21, a rotor core 22 fixed on the shaft 21, a commutator 23 fixed on the shaft 21 and adjacent to the rotor core 22, and rotor windings (not shown in the Figures) wound about teeth of the rotor core 22 and electrically connected to the commutator 23.

The stator 10 comprises an axially extending housing 11 having an open end and a closed end 13, permanent magnets 12 fixed on the inner surface of the housing 11, an endcap 30 closing the open end of the housing 11, two brush assemblies 70, and two brush covers 80. The endcap 30 is fixedly mounted to the housing 11. Two bearings 42 and 14 mounted in two bearing holders 43 and 15 of the endcap 30 and the housing rotatably support the shaft 21.

Also referring to FIGS. 3 to 6, the endcap 30 has a first member 40 and a second member 60 which are disposed in the axial direction and made of electrical insulating material. The first member 40 has an annular base plate 41 and an annular side plate 51 axially extending from the outer periphery of the base plate 41 in the direction away from the second member 60. The base plate 41 and the side plate 51 form a receiving chamber 44 with the commutator 23 being received therein. Two brush brackets 52 are oppositely formed on the side plate 51. Each brush bracket 52 has a joint portion 53 outwardly extending from the outer surface of the side plate 51 and a tubular portion 54 radially and inwardly extending from the inner surface of the side plate 51 at a position corresponding to the joint portion 53. In this embodiment, the joint portion 53 is an incomplete annular ring with two adjacent ends 55 at the position near the base plate 41. A gap 56 is therefore formed between the two adjacent ends 55. The joint portion 53 extends beyond the base plate 41 in the axial direction and has a radially extending opening 57 and a thread 58 which is formed on the outer surface thereof. The opening 57 of the joint portion 53 is in communication with a radial through hole 59 of the tubular portion 54.

The second member 60 has an annular shape and is mounted to the first member 40 via screws 61. The second member 60 has a central hole 62 for receiving the bearing holder 43 protruding from the base plate 41 of the first member 40 and a pair of holes oppositely arranged relative to the central hole 62 and aligned with the tubular portions 54 of the two brush brackets 52. A pair of electrical terminals 64 electrically insulated from each other are respectively inserted through the pair of holes and are fixed to the second member 60. Each electrical terminal 64 has a first portion 65 outside of the second member 60 for connecting a power supply and a second portion 66 between the first member 40 and the second member 60. The second portion 66 has a resilient end 67 which is able to be resiliently deformed in the axial direction.

Figure 7:
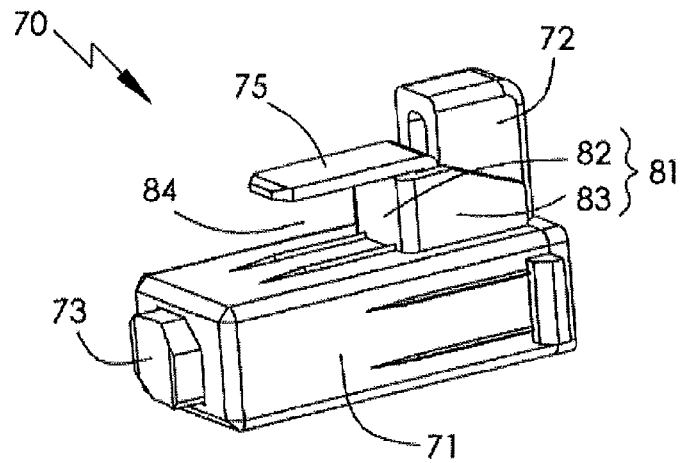
FIG. 7 shows a brush assembly being a part of the motor of FIG. 1.
Figure 8:
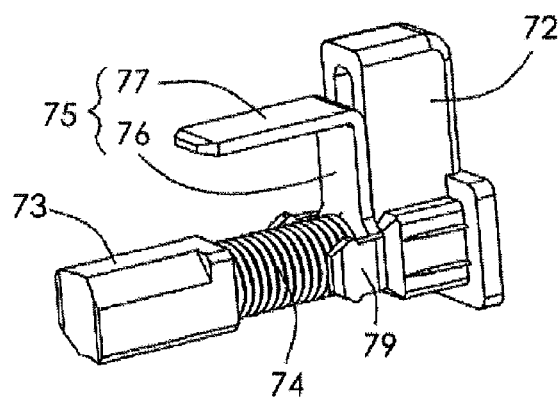
FIG. 8 shows the brush assembly with a brush holder removed.

Two brush assemblies 70 are detachably mounted to the two brush brackets 52. Referring to FIGS. 7 and 8, each brush assembly 70 has a radially extending brush holder 71, a brush cap 72 inserted into the brush holder 71, a brush 73 slidably received in the brush holder 71, a resilient member 74 for resiliently urging the brush 73 out of the brush holder, and a conductive member 75 electrically connecting the brush 73 with a corresponding electrical terminal 64 on the second member 60. The brush holder 71 and the brush cap 72 are made of non-conductive material. The conductive member 75 has a base portion 76 and a contact portion 77 radially and inwardly extending from the base portion 76 outside of the brush holder 71. A U-shaped portion 81 axially extends from one surface of the brush holder 71 facing the second member 60. The U-shaped portion 81 has a bottom 82 and two branches 83 radially extending towards the brush cap 72 from the bottom 82. The base portion 76 of the conductive member 75 is radially positioned between the bottom 82 of the U-shaped portion and the portion of the brush cap 72 being inserted between the two branches 83 so that an axial gap 84 is formed between the brush holder 71 and the contact portion 77 of the conductive member 75. The resilient member 74 is a compression spring, both ends of which are respectively fixed to the brush 73 and the base portion 76 of the conductive member 75 so that in use the brush 73 is resiliently urged to make sliding contact with segments of the commutator 23. The brush 73 and the conductive member 75 are electrically connected via a brush braided wire or shunt (not shown in the figures). Preferably, a pair of positioning portions 79 extends inwardly from the base portion 76 of the conductive member 75 to position the spring 74 there between.

When mounting the brush assembly 70 to the brush bracket 52, the brush holder 71 is inserted into the tubular portion 54. The brush 73 enters into the receiving chamber 44 to make sliding contact with the commutator 23 under the resilient urgings of the spring 74. Two branches 83 of the brush holder 71 are inserted between the two adjacent ends 55 of the joint portion 53 of the brush bracket 52. The contact portion 77 of the conductive member 75 is inserted between the resilient end 67 of the electrical terminal 64 and a step 45 on the base plate 41 so that the brush 73 is electrically connected with the electrical terminal 64. After mounting, the brush cover 80 with an inner thread 85 matching the outer thread 58 of the joint portion 53 is assembled to the brush bracket 52 via the thread structure, thus the radial position of the brush assembly 70 is fixed. The brush assembly is fixed to the brush bracket 52 by the simple screw thread connection between the brush cover 80 and the joint portion 53 of the brush bracket 52.

Figure 9:
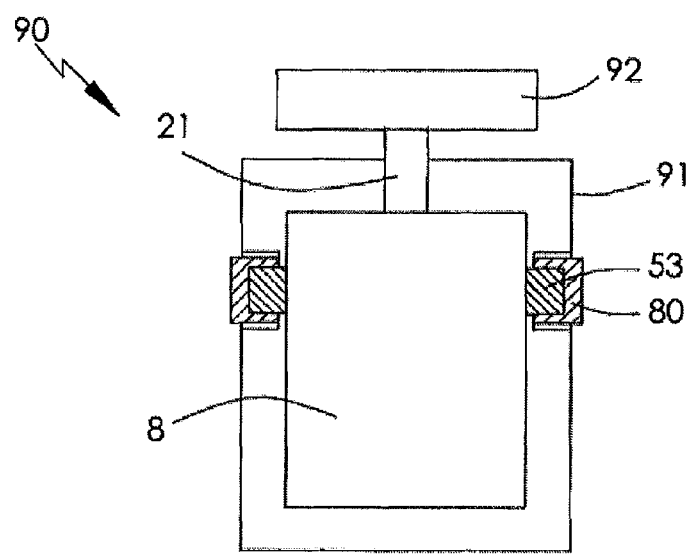
FIG. 9 is a schematic representation of the motor incorporated in an electrical appliance.

The brush electric motor in the present invention is particularly suitable for electric appliances such as hair clippers or the like. Referring to FIG. 9, when the motor is applied to such an appliance 90 which has a casing 91 and a working part 92 driven by the shaft 21 of the motor 8, holes are formed on the casing 91 and the joint portions 53 of the brush brackets pass through the holes and are arranged outside the casing 91. By this configuration, the brush assemblies can be easily replaced by screwing off the brush covers 80 from the joint portions 53, withdrawing the brush assembly from the brush bracket, inserting a new brush assembly and replacing the brush cover 80. This is done conveniently from the outside of the casing 91, without removing the motor or opening the casing 91 and without any professional skill being required.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. An electric motor comprising:
   a rotor which comprises a shaft, a rotor core fixed on the shaft, a commutator fixed on the shaft and adjacent to the rotor core, and rotor windings wound about teeth of the rotor core and electrically connected to the commutator; and
   a stator which is magnetically coupled to the rotor and comprises an endcap and at least two brush assemblies, the endcap having at least two brush brackets for holding the at least two brush assemblies and at least two electrical terminals respectively corresponding to the at least two brush brackets and having a resilient end, each brush assembly being detachably mounted to its corresponding brush bracket and having a tube brush holder, a brush received in the tube brush holder for making sliding contact with the commutator, a resilient member resiliently urging the brush against the commutator, and a conductive member electrically connecting the brush with the resilient end of a corresponding electrical terminal,
   wherein the conductive member is in contact with the resilient end of the corresponding electrical terminal and movable relative to the resilient end in a radial direction,
   wherein the endcap has a first member with the brush brackets arranged and a second member with the electrical terminals arranged, the first and second members being separately formed and mounted together, the first member and the second member being made of an electrically insulating material,
   wherein the first member has an annular base plate and an annular side plate axially extending from the annular base plate, the annular base plate and the annular side plate forming a receiving chamber,
   wherein the brush brackets are formed on the annular side plate, and
   wherein the second member is mounted on the annular base plate between the brush brackets.

2. The motor of claim 1, wherein the electric motor further comprises at least two brush covers detachably engaged with the at least two brush brackets.

3. The motor of claim 2, wherein the brush covers are connected to the brush brackets by a screw thread connection.

4. The motor of claim 1, wherein the conductive member comprises a base portion electrically connected to the brush and a contact portion radially and inwardly extending from the base portion outside of the tube brush holder and in contact with the resilient end of the electrical terminal.

5. The motor of claim 4, wherein a pair of positioning portions is received within the tube brush holder and inwardly extends from the base portion of the conductive member to position the resilient member there between.

6. The motor of claim 4, wherein the resilient ends of the electrical terminals are arranged between the first member and the second member in the axial direction;
   and the contact portion of the conductive member is axially inserted between the first member and the resilient end of the electrical terminal.

7. The motor of claim 4, wherein the brush assembly further comprises a brush cap and the base portion is at least partly received within the brush holder and arranged between the brush holder and the brush cap.

8. An electric motor comprising:
   a rotor which comprises a shaft, a rotor core fixed on the shaft, a commutator fixed on the shaft and adjacent to the rotor core, and rotor windings wound about teeth of the rotor core and electrically connected to the commutator; and
   a stator which is magnetically coupled to the rotor and comprises an endcap and at least two brush assemblies, the endcap having at least two brush brackets for holding the at least two brush assemblies and at least two electrical terminals respectively corresponding to the at least two brush brackets and having a resilient end, each brush assembly being detachably mounted to its corresponding brush bracket and having a tube brush holder, a brush received in the tube brush holder for making sliding contact with the commutator, a resilient member resiliently urging the brush against the commutator, and a conductive member electrically connecting the brush with the resilient end of a corresponding electrical terminal;
   wherein the conductive member is in contact with the resilient end of the corresponding electrical terminal and movable relative to the resilient end in a radial direction;
   wherein the conductive member comprises a base portion electrically connected to the brush and a contact portion radially and inwardly extending from the base portion outside of the tube brush holder and in contact with the resilient end of the electrical terminal;
   wherein the brush assembly further comprises a brush cap and the base portion is at least partly received within the brush holder and arranged between the tube brush holder and the brush cap; and
   wherein a U-shaped portion axially extends from the tube brush holder and has a bottom and two branches radially extending from the bottom, the base portion being radially positioned between the bottom and a portion of the brush cap being inserted between the two branches.

9. The motor of claim 8, wherein the brush bracket has a joint portion with a part annular structure having two adjacent ends, the two branches being inserted between the two adjacent ends.

10. The motor of claim 1, wherein the tube brush holder is made of non-conductive material.

11. The motor of claim 4, wherein the resilient end and the contact portion axially facing each other.

12. The motor of claim 1, wherein each electrical terminal has a portion located between the first member and the second member.

* * * * *